(12) United States Patent
Lu et al.

(10) Patent No.: US 11,664,146 B2
(45) Date of Patent: May 30, 2023

(54) THREE-PHASE TRANSFORMER ASSEMBLY AND POWER MODULE

(71) Applicant: Delta Electronics (Shanghai) CO., LTD, Shanghai (CN)

(72) Inventors: Zengyi Lu, Shanghai (CN); Tianding Hong, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 198 days.

(21) Appl. No.: 17/215,010

(22) Filed: Mar. 29, 2021

(65) Prior Publication Data

US 2021/0366645 A1 Nov. 25, 2021

(30) Foreign Application Priority Data

May 25, 2020 (CN) .......................... 202010447188.X (51) Int. Cl.
*H01F 27/24* (2006.01)
*H01F 27/28* (2006.01)
*H02M 3/335* (2006.01)

(52) U.S. Cl.
CPC ............. *H01F 27/24* (2013.01); *H01F 27/28* (2013.01); *H02M 3/33576* (2013.01)

(58) Field of Classification Search
CPC ..... H01F 27/24; H01F 27/28; H02M 3/33576
See application file for complete search history.

(56) References Cited

U.S. PATENT DOCUMENTS

| 10,186,974 B2* | 1/2019 | Yang ................... H01F 27/2823 |
|---|---|---|
| 2014/0340940 A1 | 11/2014 | Ouyang |
| 2017/0330678 A1 | 11/2017 | Harrison |
| 2017/0345541 A1 | 11/2017 | Yang et al. |
| 2018/0108472 A1 | 4/2018 | Pagenkopf |

(Continued)

FOREIGN PATENT DOCUMENTS

| CN | 106057433 A | 10/2016 |
|---|---|---|
| CN | 206211537 U | 5/2017 |

(Continued)

OTHER PUBLICATIONS

The 1st Office Action dated Aug. 13, 2021 for CN patent application No. 202010447154.0.

(Continued)

*Primary Examiner* — Adolf D Berhane
(74) *Attorney, Agent, or Firm* — Qinghong Xu (57) ABSTRACT

A three-phase transformer includes a magnetic core and winding, wherein the magnetic core includes first and second cover plates and magnetic pillar units. The first and second cover plates are arranged opposite to each other, the magnetic pillar units are sandwiched between the first and second cover plates; a first winding is wound on a first magnetic pillar of a first magnetic pillar unit, and a fourth winding is wound on a second magnetic pillar of the first magnetic pillar unit; a second winding is wound on a first magnetic pillar of a second magnetic pillar unit, and a fifth winding is wound on a second magnetic pillar of the second magnetic pillar unit; a third winding is wound on a first magnetic pillar of a third magnetic pillar unit, and a sixth winding is wound on a second magnetic pillar of the third magnetic pillar unit.

14 Claims, 6 Drawing Sheets

(56) References Cited

U.S. PATENT DOCUMENTS

| | | | | |
|---|---|---|---|---|
| 2021/0366650 A1* | 11/2021 | Lu | ................. | H02M 7/003 |
| 2022/0084734 A1* | 3/2022 | Lai | ................. | H02M 3/33561 |
| 2022/0208425 A1* | 6/2022 | Lu | ................. | H01F 37/00 |
| 2023/0009358 A1* | 1/2023 | Li | ................. | H02M 1/0058 |

FOREIGN PATENT DOCUMENTS

| | | | |
|---|---|---|---|
| CN | 106998142 | A | 8/2017 |
| CN | 106057433 | B | 3/2018 |
| CN | 108648899 | A | 10/2018 |
| CN | 108777220 | A | 11/2018 |
| CN | 109390118 | A | 2/2019 |
| CN | 107077951 | B | 5/2019 |
| KR | 101828831 | B1 | 2/2018 |
| WO | 2009059069 | A2 | 5/2009 |
| WO | 2015066997 | A1 | 5/2015 |

OTHER PUBLICATIONS

The 2nd Office Action dated Jun. 3, 2021 for CN patent application No. 202010447188.X.
The 1st Office Action dated Dec. 10, 2020 by the CNIPA from application No. 202010447188.X.
Non-Final Rejection dated Dec. 23, 2022 of U.S. Appl. No. 17/228,677.
Notice of Allowance dated Jan. 31, 2023 of U.S. Appl. No. 17/215,010.

\* cited by examiner

THREE-PHASE TRANSFORMER ASSEMBLY AND POWER MODULE

CROSS REFERENCE

This application is based upon and claims priority to Chinese Patent Application No. 202010447188.X, filed on May 25, 2020, the disclosure of which is incorporated herein by reference in its entirety.

TECHNICAL FIELD

The present disclosure relates to the field of power electronics technology, and in particular to a three-phase transformer assembly and a power module.

BACKGROUND

Currently, in power modules with high power density, transformers account for a large proportion in the terms of volume, weight, and loss, so the status of transformers is becoming more and more important.

Especially in power modules including multiple transformers, the multiple transformers are often provided independently, resulting in a large volume of an overall transformer, which is difficult to be applied to power modules with higher integration.

SUMMARY

According to a first aspect of the present disclosure, there is provided a three-phase transformer assembly including two three-phase transformers, and the three-phase transformer assembly includes:

a magnetic core including a first cover plate, a second cover plate and magnetic pillar units, wherein the first cover plate and the second cover plate are arranged opposite to each other, the magnetic pillar units are sandwiched between the first cover plate and the second cover plate and includes a first magnetic pillar unit, a second magnetic pillar unit and a third magnetic pillar unit, each of the magnetic pillar units includes a first magnetic pillar and a second magnetic pillar; and windings including a first winding, a second winding, a third winding, a fourth winding, a fifth winding, and a sixth winding;

wherein the first winding is wound on the first magnetic pillar of the first magnetic pillar unit, the fourth winding is wound on the second magnetic pillar of the first magnetic pillar unit, and a first excitation current flowing through the first winding surrounds the first magnetic pillar of the first magnetic pillar unit in a direction opposite to a direction in which a fourth excitation current flowing through the fourth winding surrounds the second magnetic pillar of the first magnetic pillar unit;

the second winding is wound on the first magnetic pillar of the second magnetic pillar unit, the fifth winding is wound on the second magnetic pillar of the second magnetic pillar unit, and a second excitation current flowing through the second winding surrounds the first magnetic pillar of the second magnetic pillar unit in a direction opposite to a direction in which a fifth excitation current flowing through the fifth winding surrounds the second magnetic pillar of the second magnetic pillar unit; and the third winding is wound on the first magnetic pillar of the third magnetic pillar unit, the sixth winding is wound on the second magnetic pillar of the third magnetic pillar unit, and a third excitation current flowing through the third winding surrounds the first magnetic pillar of the third magnetic pillar unit in a direction opposite to a direction in which a sixth excitation current flowing through the sixth winding surrounds the second magnetic pillar of the third magnetic pillar unit.

In an embodiment of the present disclosure, the first magnetic pillar unit, the second magnetic pillar unit, and the third magnetic pillar unit are sequentially arranged at intervals along a first direction. In each of the magnetic pillar units, the first magnetic pillar and the second magnetic pillar are arranged at intervals along a second direction, and an angle between the first direction and the second direction is in a range from 60° to 120°, and two ends of each of the first magnetic pillars are respectively connected to the first cover plate and the second cover plate, and two ends of each of the second magnetic pillars are respectively connected to the first cover plate and the second cover plate.

In an embodiment of the present disclosure, the first cover plate and the second cover plate are both of integrated plate structures and are arranged in parallel, and the first magnetic pillars and the second magnetic pillars are perpendicular to the first cover and the second cover.

In an embodiment of the present disclosure, each of the windings includes a primary winding and a secondary winding.

In an embodiment of the present disclosure, the first excitation current and the fourth excitation current have a same amplitude and phase, the second excitation current and the fifth excitation current have a same amplitude and phase, and the third excitation current and the sixth excitation current have a same amplitude and phase, and phases of the first excitation current, the second excitation current, and the third excitation current are different by 120°.

In an embodiment of the present disclosure, the direction in which the first excitation current surrounds the first magnetic pillar of the first magnetic pillar unit, the direction in which the second excitation current surrounds the first magnetic pillar of the second magnetic pillar unit, and the direction in which the third excitation current surrounds the first magnetic pillar of the third magnetic pillar unit are the same.

According to a second aspect of the present disclosure, there is provided a power module including the three-phase transformer assembly mentioned above.

In an embodiment of the present disclosure, the power module includes two three-phase LLC circuit modules;

the first excitation current and the fourth excitation current have a same amplitude and phase, the second excitation current and the fifth excitation current have a same amplitude and phase, and the third excitation current and the sixth excitation current have a same amplitude and phase; and phases of between the first excitation current, the second excitation current, and the third excitation current are different by 120°.

In an embodiment of the present disclosure, the direction in which the first excitation current surrounds the first magnetic pillar of the first magnetic pillar unit, the direction in which the second excitation current surrounds the first magnetic pillar of the second magnetic pillar unit, and the direction in which the third excitation current surrounds the first magnetic pillar of the third magnetic pillar unit are the same.

In an embodiment of the present disclosure, the first winding, the second winding and the third winding are respectively used to form a first transformer, a second transformer and a third transformer of a first three-phase LLC circuit module, and the fourth winding, the fifth winding and the sixth winding are respectively used to form a first transformer, a second transformer and a third transformer of a second three-phase LLC circuit module.

In an embodiment of the present disclosure, each of the two three-phase LLC circuit modules includes input terminals for electrically connecting a same DC power source; first, second and third switch bridge arms connected in parallel between a positive terminal and a negative terminal of the input terminals; first, second and third transformers; output terminals for electrically connecting loads; and fourth, fifth and sixth switch bridge arms connected in parallel between a positive terminal and a negative terminal of the output terminals; and in each of the three-phase LLC circuit modules, a midpoint of the first switching bridge arm is electrically connected to a primary winding of the first transformer through a first resonant inductor, and a secondary winding of the first transformer is electrically connected to a midpoint of the fourth switching bridge arm; a midpoint of the second switching bridge arm is electrically connected to a primary winding of the second transformer through a second resonant inductor, and a secondary winding of the second transformer is electrically connected to a midpoint of the fifth switching bridge arm; and a midpoint of the third switching bridge arm is electrically connected to a primary winding of the third transformer through a third resonant inductor, and a secondary winding of the third transformer is electrically connected to a midpoint of the sixth switch bridge arm.

BRIEF DESCRIPTION OF THE DRAWINGS

Various objectives, features, and advantages of the present disclosure will become more apparent in consideration of the following detailed description of the preferred embodiments of the present disclosure in conjunction with the accompanying drawings. The drawings are merely exemplary illustrations of the present disclosure and are not necessarily drawn to scale. The same reference numerals refer to the same or similar parts throughout the drawings in which.

REFERENCE NUMERALS

10. First Cover Plate; 20. Second Cover Plate; 30. Magnetic Pillar Unit;
31. First Magnetic Pillar Unit; 311. First Magnetic Pillar; 312. Second Magnetic Pillar;
32. Second Magnetic Pillar Unit; 321. First Magnetic Pillar; 322. Second Magnetic Pillar;
33. Third Magnetic Pillar Unit; 331. First Magnetic Pillar; 332. Second Magnetic Pillar;
40. Winding; 41. First Winding; 411. First Primary Winding; 412. First Secondary Winding; 42. Second Winding; 421. Second Primary Winding; 422. Second Secondary Winding; 43. Third Winding; 431. Third Primary Winding; 432. Third Secondary Winding; 44. Fourth Winding; 441. Fourth Primary Winding; 442. Fourth Secondary Winding; 45. Fifth Winding; 451. Fifth Primary Winding; 452. Fifth Secondary Winding; 46. Sixth Winding; 461. Sixth Primary Winding; 462. Sixth Secondary Winding.

DETAILED DESCRIPTION

Typical embodiments embodying the features and advantages of the present disclosure will be described in detail in the following description. It should be understood that the present disclosure can have various changes in different embodiments, which do not depart from the scope of the present disclosure, and the description and drawings are essentially for illustrative purposes, rather than limiting the present disclosure.

In the description of different exemplary embodiments of the present disclosure, reference is made to the accompanying drawings, which form a part of the present disclosure and show different exemplary structures, systems, and steps that can implement various aspects of the present disclosure by way of example. It should be understood that other specific solutions of components, structures, exemplary devices, systems, and steps may be used, and structural and functional modifications may be made without departing from the scope of the present disclosure. Moreover, although the terms "above", "between", "within", etc. may be used in this specification to describe different exemplary features and elements of the present disclosure, these terms are used herein for convenience only, for example, in the directions of the examples in the drawings. Nothing in this specification should be understood as requiring a specific three-dimensional directions of the structure to fall within the scope of the present disclosure.

Figure 1:
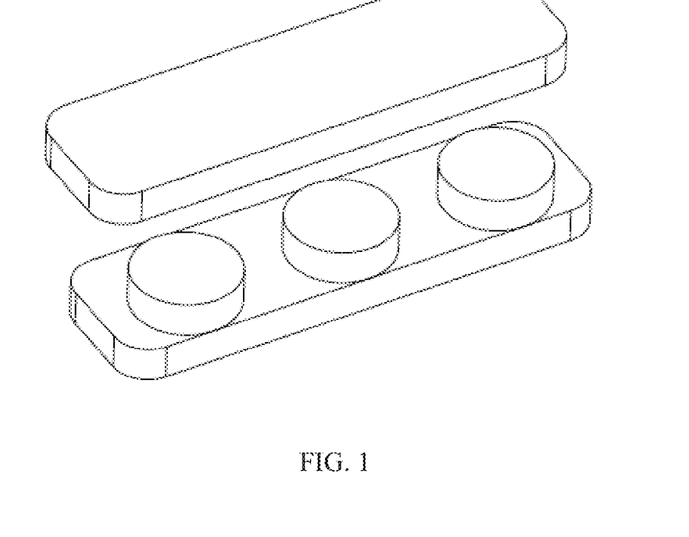
FIG. 1 is a schematic diagram showing an exploded structure of a magnetic core of a three-phase transformer according to the prior art.
Figure 2:
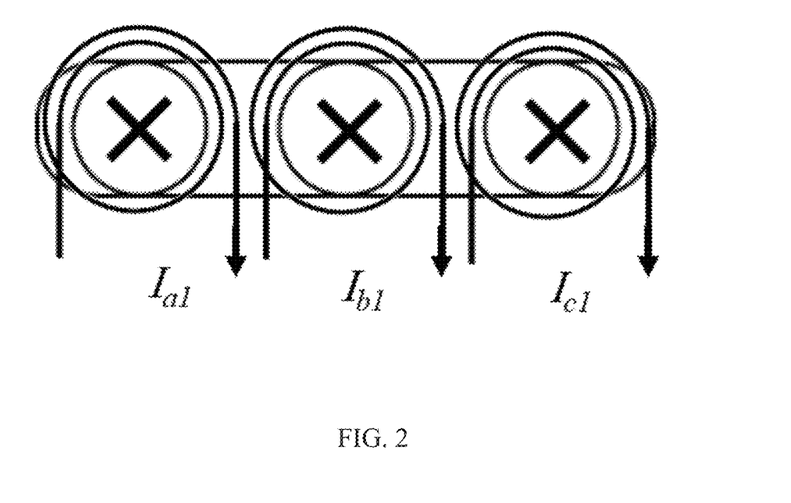
FIG. 2 is a schematic diagram showing a magnetic flux trend of a three-phase transformer according to the prior art.
Figure 3:
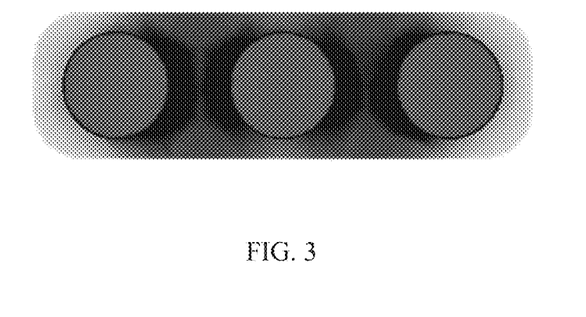
FIG. 3 is a schematic diagram showing a magnetic flux density distribution of a three-phase transformer according to the prior art.

Referring to FIG. 1 to FIG. 3, in a traditional three-phase transformer, a magnetic core of the three-phase transformer only needs to include three wire winding pillars, an upper cover plate and a lower cover plate. A result of superposition of a first magnetic flux $\phi a$, a second magnetic flux $\phi b$ and a third magnetic flux $\phi c$ of the three-phase transformer on the upper cover plate and the lower cover plate amount to zero, but the magnetic fluxes will be concentrated at the upper cover plate and the lower cover plate resulting in a higher magnetic flux density at the upper cover plate and the lower cover plate and a larger loss of the magnetic core.

Figure 7:
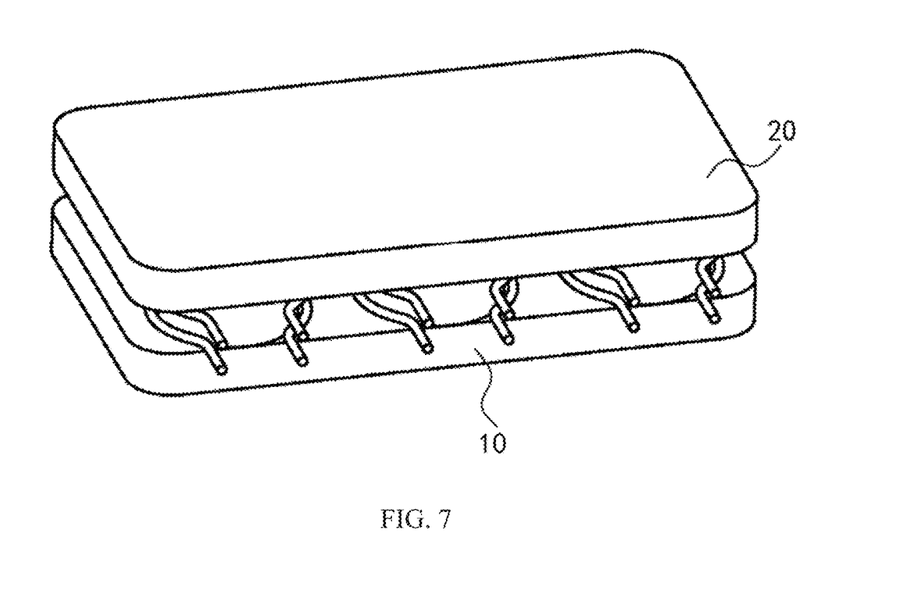
FIG. 7 is a structural diagram of a three-phase transformer assembly according to some embodiments.
Figure 8:
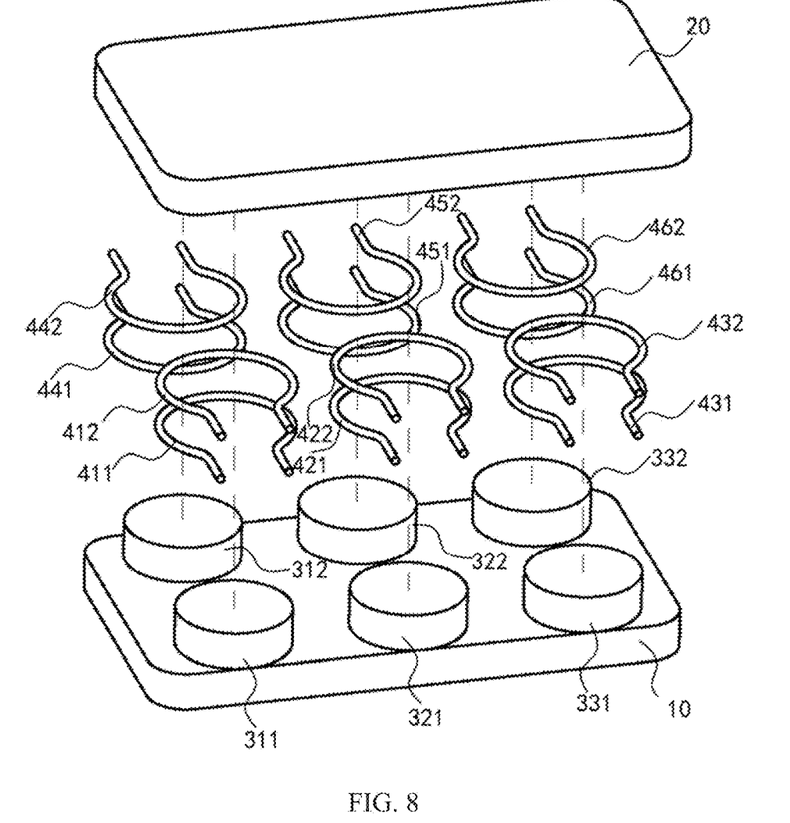
FIG. 8 is a schematic diagram showing a exploded structure of a three-phase transformer assembly according to some embodiments.
Figure 9:
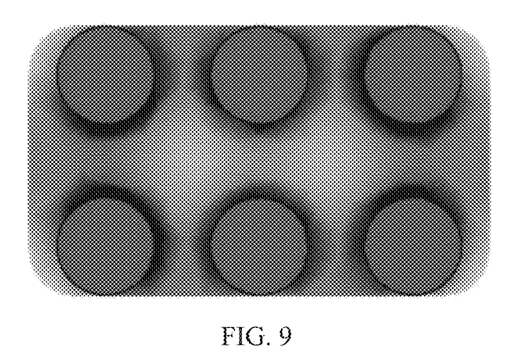
FIG. 9 is a schematic diagram showing a magnetic flux density distribution of a three-phase transformer assembly according to some embodiments.

Referring to FIGS. 4 to 9, embodiments of the present disclosure provide a three-phase transformer assembly and a power module including the three-phase transformer assembly. The three-phase transformer assembly includes two three-phase transformers. The three-phase transformer assembly includes a magnetic core and windings 40. The magnetic core includes a first cover plate 10, a second cover plate 20, and magnetic pillar units 30. The first cover plate 10 and the second cover plate 20 are disposed opposite to each other. The magnetic pillar units 30 are sandwiched between the first cover plate 10 and the second cover plate 20, and include a first magnetic pillar unit 31, a second magnetic pillar unit 32, and a third magnetic pillar unit 33. Each of the magnetic pillar units 30 includes a first magnetic pillar and a second magnetic pillar. The magnetic pillar unit 31 includes a first magnetic pillar 311 and a second magnetic pillar 312, the second magnetic pillar unit 32 includes a first magnetic pillar 321 and a second magnetic pillar 322, and the third magnetic pillar unit 33 includes a first magnetic pillar 331 and a second magnetic pillar 332. The windings 40 are wound on the first magnetic pillar and the second magnetic pillar of each magnetic pillar unit 30. In each magnetic pillar unit 30, an excitation current flowing through the winding 40 wound on the first magnetic pillar surrounds the first magnetic pillar in a direction opposite to a direction in which an excitation current flowing through the winding 40 wound on the second magnetic pillar surrounds the second magnetic pillar; wherein, the excitation current flowing through the winding 40 wound on the first magnetic pillar unit 31 generates a first magnetic flux ϕa, the excitation current flowing through the winding 40 wound on the second magnetic pillar unit 32 generates a second magnetic flux ϕb, and the excitation current flowing through the winding 40 wound on the third magnetic pillar unit 33 generates a third magnetic flux ϕc. The first magnetic flux ϕa, the second magnetic flux ϕb and the third magnetic flux ϕc are superimposed on the first cover plate 10 and the second cover plate 20. Since ϕa+ϕb+ϕc=0, the two three-phase transformers can work independently, and at the same time, the superimposition of magnetic fluxes at the cover plates results in dispersed magnetic fluxes at the cover plates, achieving the effect of reducing the magnetic flux density, as shown in FIG. 9.

In the three-phase transformer assembly according to this embodiment, three magnetic pillar units 30 are sandwiched between the first cover plate 10 and the second cover plate 20, thereby improving the integration degree of the three-phase transformer assembly. Moreover, the magnetic fluxes of the six windings 40 are at least partially offset on the first cover plate 10, thereby reducing the magnetic core loss and further reducing the volume of the three-phase transformer assembly.

Figure 5:
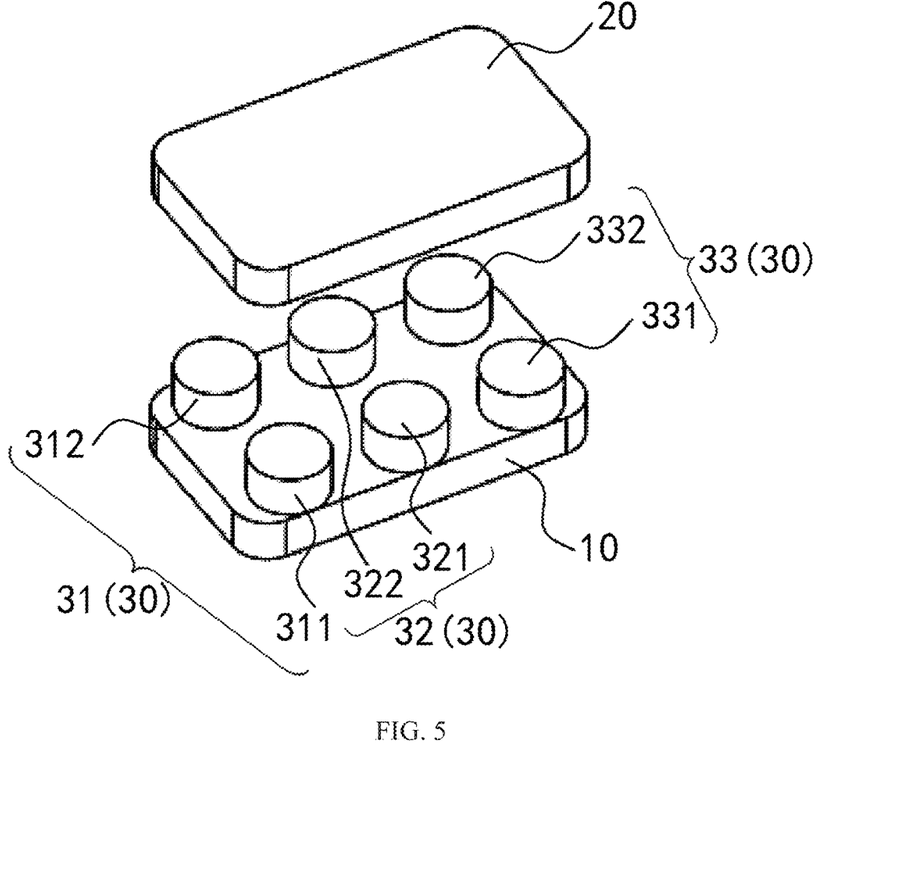
FIG. 5 is a partial structural diagram of a three-phase transformer assembly according to some embodiments.
Figure 6:
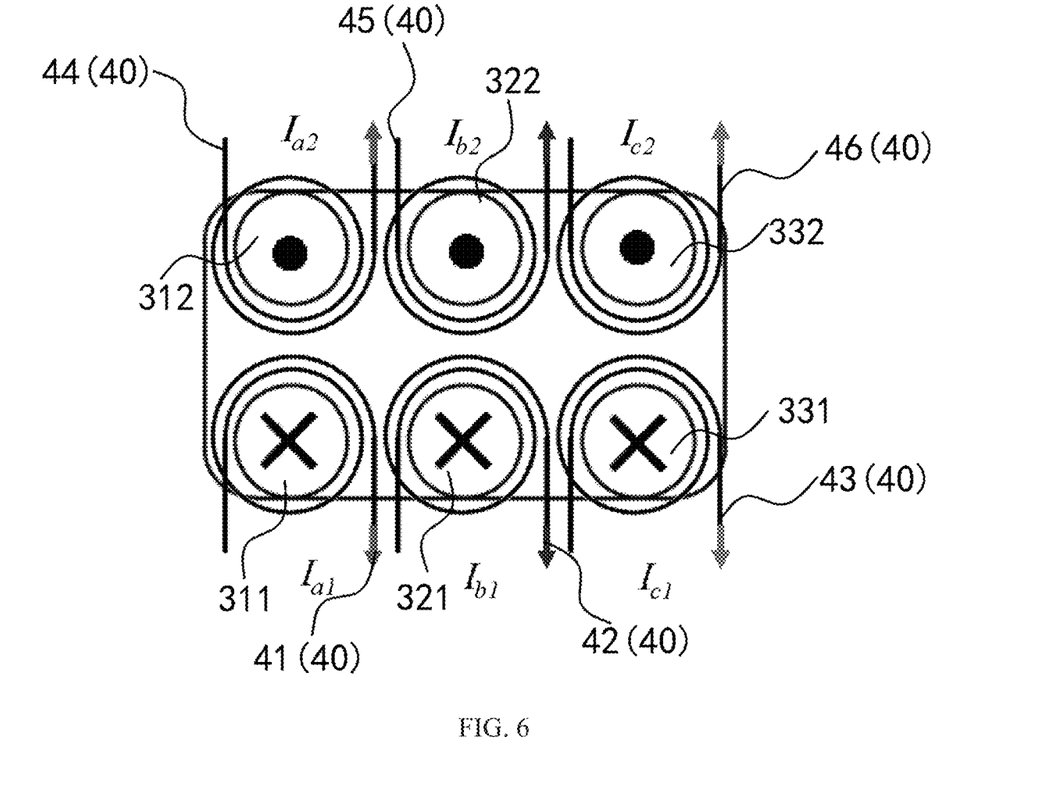
FIG. 6 is a schematic diagram showing a magnetic flux trend of a three-phase transformer assembly according to some embodiments.

Please refer to FIG. 5 to FIG. 9. In one embodiment, as shown in FIGS. 6 and 8, the windings 40 include a first winding 41, a second winding 42, a third winding 43, a fourth winding 44, a fifth winding 45 and a sixth winding 46. The first winding 41 is wound on the first magnetic pillar 311 of the first magnetic pillar unit 31, the fourth winding 44 is wound on the second magnetic pillar 312 of the first magnetic pillar unit 31, and a first excitation current $I_{a1}$ flowing through the first winding 41 surrounds the first magnetic pillar 311 in a direction opposite to a direction in which a fourth excitation current $I_{a2}$ flowing through the fourth winding 44 surrounds the second magnetic pillar 312. The directions being opposite described here refer to that if a direction of winding on a first magnetic pillar is clockwise, a direction of winding on the second magnetic pillar will be counterclockwise; and vice versa. For example, if the first excitation current $I_{a1}$ surrounds the first magnetic pillar 311 in the clockwise direction, and the fourth excitation current Ia2 surrounds the second magnetic pillar 312 in the counterclockwise direction, the first magnetic flux ϕa generated by the first excitation current $I_{a1}$ and the fourth excitation current $I_{a2}$ flows in a closed magnetic circuit formed by the first magnetic pillar 311, the first cover plate 10, the second magnetic pillar 312 and the second cover plate 20, thereby reducing leakage of the first magnetic flux ϕa. The second winding 42 is wound on the first magnetic pillar 321 of the second magnetic pillar unit 32, the fifth winding 45 is wound on the second magnetic pillar 322 of the second magnetic pillar unit 32, and a second excitation current $I_{b1}$ flowing through the second winding 42 surrounds the first magnetic pillar 321 in a direction opposite to a direction in which a fifth excitation current $I_{b2}$ flowing through the fifth winding 45 surrounds the second magnetic pillar 322. For example, if the second excitation current $I_{b1}$ surrounds the first magnetic pillar 321 in the clockwise direction, and the fifth excitation current $I_{b1}$ surrounds the second magnetic pillar 322 in the counterclockwise direction, the second magnetic flux ϕb generated by the second excitation current $I_{b1}$ and the fifth excitation current $I_{b2}$ flows in a closed magnetic circuit formed by the first magnetic pillar 321, the first cover plate 10, the second magnetic pillar 322 and the second cover plate 20, thereby reducing the leakage of the second magnetic flux ϕb. The third winding 43 is wound on the first magnetic pillar 331 of the third magnetic pillar unit 33, the sixth winding is wound on the second magnetic pillar 332 of the third magnetic pillar unit, and a third excitation current $I_{c1}$ flowing through the third winding 43 surrounds the first magnetic pillar 331 in a direction opposite to a direction in which the sixth excitation current $I_{c2}$ flowing through the sixth winding 46 surrounds the second magnetic pillar 332. For example, the third excitation current $I_{c1}$ surrounds the first magnetic pillar in the clockwise direction 331, the sixth excitation current $I_{c2}$ surrounds the second magnetic pillar 332 in the counterclockwise direction, and the third magnetic flux ϕc generated by the third excitation current $I_{c1}$ and the sixth excitation current $I_{c2}$ flows in a closed magnetic circuit formed by the first magnetic pillar 331, the first cover 10, the second magnetic pillar 332 and the second cover 20, thereby reducing the leakage of the third magnetic flux ϕc. The symbol "x" indicates that the magnetic flux direction is inward and perpendicular to the paper surface, and the symbol "●" indicates that the magnetic flux direction is outward and perpendicular to the paper surface. In this embodiment, the first magnetic flux ϕa, the second magnetic flux ϕb and the third magnetic flux ϕc each flows along the respective closed magnetic circuit to prevent the magnetic flux from leaking to the air, which is beneficial to improve the effect of resistance to Electromagnetic Interference (EMI). A Printed Circuit Board (PCB) or multi-stranded wire can be used for the windings 40.

In an embodiment, each winding 40 includes a primary winding and a secondary winding. As shown in FIGS. 7 and 8, the first winding 41 includes a first primary winding 411 and a first secondary winding 412. Both the first primary winding 411 and the first secondary winding 412 are wound on the first magnetic pillar 311 of the first magnetic pillar unit 31. The second winding 42 includes a second primary winding 421 and a second secondary winding 422. Both the second primary winding 421 and the second secondary winding 422 are wound on the first magnetic pillar 321 of the second magnetic pillar unit 32. The third winding 43 includes a third primary winding 431 and a third secondary winding 432. Both the third primary winding 431 and the third secondary winding 432 are wound on the first magnetic pillar 331 of the third magnetic pillar unit 33. The fourth winding 44 includes a fourth primary winding 441 and a fourth secondary winding 442. Both the fourth primary winding 441 and the fourth secondary winding 442 are wound on the second magnetic pillar 312 of the first magnetic pillar unit 31. The fifth winding 45 includes a fifth primary winding 451 and a fifth secondary winding 452. Both the fifth primary winding 451 and the fifth secondary winding 452 are wound on the second magnetic pillar 322 of the second magnetic pillar unit 32. The sixth winding 46 includes a sixth primary winding 461 and a sixth secondary winding 462. Both the sixth primary winding 461 and the sixth secondary winding 462 are wound on the second magnetic pillar 332 of the third magnetic pillar unit 33.

Please refer to FIG. 5 to FIG. 9. In an embodiment, as shown in FIG. 5, the first magnetic pillar unit 31, the second magnetic pillar unit 32, and the third magnetic pillar unit 33 are sequentially arranged at intervals along a first direction. In each magnetic pillar unit 30, the first magnetic pillar and the second magnetic pillar are arranged at intervals along a second direction, and an angle between the first direction and the second direction is ranging from 60° to 120°. For example, the first direction is perpendicular to the second direction. Specifically, the first magnetic pillar 311 of the first magnetic pillar unit 31, the first magnetic pillar 321 of the second magnetic pillar unit 32, and the first magnetic pillar 331 of the third magnetic pillar unit 33 are arranged at intervals in a lateral direction, and the second magnetic pillar 312 of the first magnetic pillar unit 31, the second magnetic pillar 322 of the second magnetic pillar unit 32, and the second magnetic pillar 332 of the third magnetic pillar unit 33 are arranged at intervals in the lateral direction, the first magnetic pillar 311 and the second magnetic pillar 312 of the first magnetic pillar unit 31 are arranged at intervals in a longitudinal direction, the first magnetic pillar 321 and the second magnetic pillar 322 of the second magnetic pillar unit 32 are arranged at intervals in the longitudinal direction, and the first magnetic pillar 331 and the second magnetic pillar 331 of the third magnetic pillar unit 33 are arranged at intervals in the longitudinal direction. Two ends of each of the first magnetic pillars are respectively connected to the first cover plate 10 and the second cover plate 20, and two ends of each of the second magnetic pillars are respectively connected to the first cover plate 10 and the second cover plate 20, that is, the first cover plate 10 and the second cover plate 20 are respectively arranged below and above the six magnetic pillars to form a closed magnetic circuit. In this embodiment, the magnetic core includes six magnetic pillars which are arranged in a 2×3 array, but the present application is not limited thereto. In some other embodiments, the six magnetic pillars may be arranged in a non-array arrangement, and the number of magnetic pillars may also be different.

In an embodiment, as shown in FIG. 7, the first cover plate 10 and the second cover plate 20 are both of integrated plate structures, and are arranged in parallel. The first magnetic pillars and the second magnetic pillars are perpendicular to the first cover plate 10 and the second cover plate 20. The first magnetic pillars and the second magnetic pillars may be linear magnetic pillars, which are vertically sandwiched between the first cover plate 10 and the second cover plate 20, and the first magnetic pillar and the second magnetic pillar have a same height. This structure of the magnetic core is simple and easy to manufacture.

Figure 4:
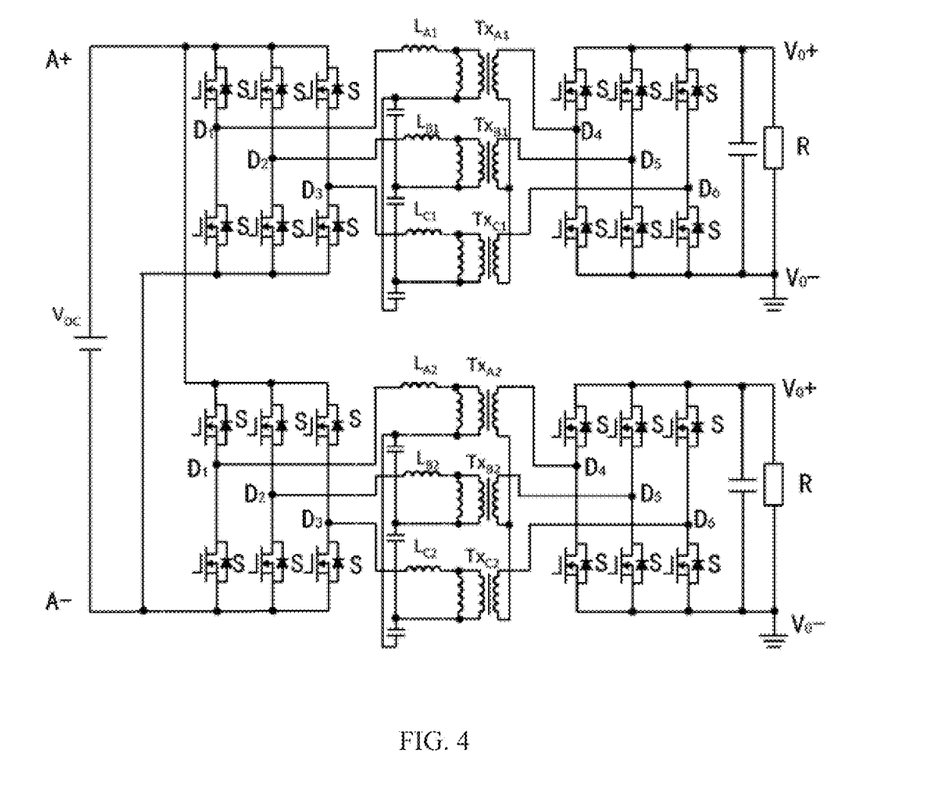
FIG. 4 is a schematic diagram of a double three-phase LLC circuit module according to some embodiments.

In an embodiment, as shown in FIG. 4, a power module is provided. The power module includes two three-phase LLC circuit modules, input terminals of which are connected in parallel. The two three-phase LLC circuit modules may include the three-phase transformer assembly in FIG. 6.

As shown in FIGS. 4 and 6, the three-phase transformer assembly in FIG. 6 can be used as the transformer in FIG. 4. For example, the first winding 41, the second winding 42 and the third winding 43 can be respectively used to form a first transformer $Tx_{A1}$, a second transformer $Tx_{B1}$ and a third transformer $Tx_{C1}$ of the first three-phase LLC circuit module, and the fourth winding 44, the fifth winding 45 and the sixth winding 46 are respectively used to form a first transformer $Tx_{A2}$, a second transformer $Tx_{B2}$, and a third transformer $Tx_{C2}$ of the second three-phase LLC circuit module. Specifically, each winding includes two sub-windings, which are respectively used as a primary winding and a secondary winding of the corresponding transformer. For example, the first winding 41 includes two sub-windings which are respectively used as the primary winding and the secondary winding of first transformer $Tx_{A1}$, that is, a first primary winding 411 and a first secondary winding 412. In this embodiment, the first excitation current $I_{a1}$ flows through the first winding 41, the second excitation current $I_{b1}$ flows through the second winding 42, the third excitation current $I_{c1}$ flows through the third winding 43, the fourth excitation current $I_{a2}$ flows through the fourth winding, the fifth excitation current $I_{b2}$ flows through the fifth winding 45, and the sixth excitation current $I_{c2}$ flows through the sixth winding 46. It is to be noted that the first excitation current $I_{a1}$ may refer to the excitation currents flowing through two sub-windings of the first winding 41. It can be set such that the first excitation current $I_{a1}$ and the fourth excitation current $I_{a2}$ have the same amplitude and phase, the second excitation current $I_{b1}$ and the fifth excitation current $I_{b2}$ have the same amplitude and phase, and the third excitation current $I_{c1}$ and the sixth excitation current $I_{c2}$ have the same amplitude and phase. The phases of the first excitation current $I_{a1}$, the second excitation current $I_{b1}$, and the third excitation current $I_{c1}$ are different by 120°, and they are all triangular waves. The directions of the first excitation current $I_{a1}$, the second excitation current $I_{b1}$, and the third excitation current $I_{c1}$ can be set to be the same. Specifically, as shown in FIG. 6, the direction in which the first excitation current $I_{a1}$ surrounds the first magnetic pillar of the first magnetic pillar unit, the direction in which the second excitation current $I_{b1}$ surrounds the first magnetic pillar of the second magnetic pillar unit and the direction in which the third excitation current $I_{c1}$ surrounds the first magnetic pillar of the third magnetic pillar unit are all the same, for example, in the clockwise direction. Correspondingly, a phase difference between the first magnetic flux φa generated by the first excitation current $I_{a1}$ and the fourth excitation current $I_{a2}$, the second magnetic flux φb generated by the second excitation current $I_{b1}$ and the fifth excitation current $I_{b2}$, and the third magnetic flux φc generated by the third excitation current $I_{c1}$ and the sixth excitation current $I_{c2}$ is also 120°. A sum of the first magnetic flux φa, the second magnetic flux φb, and the third magnetic flux φc superimposed on the first cover plate 10 and the second cover plate 20, φa+φb+φc, is reduced, achieving the effect of offsetting of the three magnetic fluxes, which can effectively reduce the magnetic core loss at the cover plates.

In an embodiment, each of the two three-phase LLC circuit modules includes: input terminal electrodes A+ and A− for electrically connecting the same DC power supply VDC; first, second and third switch bridge arms connected in parallel between the positive electrode A+ and the negative electrode A− of the input terminals; a first transformer, a second transformer and a third transformer; output terminals Vo+ and Vo− for electrically connecting loads R; and fourth, fifth and sixth switch bridge arms connected in parallel between the positive electrode Vo+ and the negative electrode Vo−. In each three-phase LLC circuit module, a midpoint D1 of the first switching bridge arm is electrically connected to the primary winding of the first transformer through a first resonant inductor, and the secondary winding of the first transformer is electrically connected to a midpoint D4 of the fourth switching bridge arm; a midpoint D2 of the second switching bridge arm is electrically connected to the primary winding of the second transformer through a second resonant inductor, and the secondary winding of the second transformer is electrically connected to a midpoint D5 of the fifth switching bridge arm; a midpoint D3 of the third switching bridge arm is electrically connected to the primary winding of the third transformer through a third resonant inductor, and the secondary winding of the third transformer is electrically connected to a midpoint D6 of the sixth switch bridge arm. Specifically, in the first three-phase LLC circuit module, the midpoint D1 of the first switching bridge arm is electrically connected to the primary winding of the first transformer $Tx_{A1}$ through the first inductor $L_{A1}$, and the midpoint D2 of the second switching bridge arm is electrically connected to the primary winding of the second transformer $Tx_{B1}$ through the first second inductor $L_{B1}$, and the midpoint D3 of the third switch bridge arm is electrically connected to the primary winding of the third transformer $Tx_{C1}$ through the third inductor $L_{C1}$. In the second three-phase LLC circuit module, the midpoint D1 of the first switch bridge arm is electrically connected to the primary winding of the first transformer $Tx_{A2}$ through the fourth inductor $L_{A2}$, the midpoint D2 of the second switch bridge arm is electrically connected to the primary winding of the second transformer $Tx_{B2}$ through the fifth inductor $L_{B2}$, and the midpoint D3 of the third switch bridge arm is electrically connected to the primary winding of the third transformer $Tx_{C2}$ through the sixth inductor $L_{C2}$. In this embodiment, each of the switch bridge arms may include two switch devices S connected in series.

With the three-phase transformer assembly of the present disclosure, the integration of the three-phase transformer assembly is improved by sandwiching three magnetic pillar units between the first cover plate and the second cover plate. Moreover, the magnetic fluxes of the six windings are superposed on the first cover plate and the second cover plate, achieving the effect of reducing the magnetic flux density, which can reduce thicknesses of the first cover plate and the second cover plate, thereby reducing a volume of the three-phase transformer assembly, or the magnetic fluxes of the six windings are superposed on the first cover plate and the second cover plate, achieving the effect of reducing the high-frequency magnetic flux density, which can reduce the loss of the first cover plate and the second cover plate, thereby reducing the loss of the three-phase transformer.

Those skilled in the art will easily think of other embodiments of the present disclosure after considering the description and practicing the disclosure disclosed herein. The present disclosure is intended to cover any variations, uses, or adaptive changes of the present disclosure which follow the general principles of the present disclosure and include common knowledge or conventional technical means in the art not disclosed in the present disclosure. The description and the exemplary embodiments are considered as exemplary only, and a true scope of the present disclosure are defined by the appended claims.

It should be understood that the present disclosure is not limited to the precise structures that have been described above and shown in the drawings, and various modifications and changes can be made without departing from the scope thereof. The scope of the present disclosure is defined only by the appended claims.

What is claimed is:

1. A three-phase transformer assembly comprising two three-phase transformers, the three-phase transformer assembly comprising:
   a magnetic core comprising a first cover plate, a second cover plate and magnetic pillar units, wherein the first cover plate and the second cover plate are arranged opposite to each other, the magnetic pillar units are sandwiched between the first cover plate and the second cover plate, the magnetic pillar units comprise a first magnetic pillar unit, a second magnetic pillar unit, and a third magnetic pillar unit, each of the magnetic pillar units comprises a first magnetic pillar and a second magnetic pillar; and
   windings comprising a first winding, a second winding, a third winding, a fourth winding, a fifth winding, and a sixth winding,
   wherein the first winding is wound on the first magnetic pillar of the first magnetic pillar unit, the fourth winding is wound on the second magnetic pillar of the first magnetic pillar unit, and a first excitation current flowing through the first winding surrounds the first magnetic pillar of the first magnetic pillar unit in a direction opposite to a direction in which a fourth excitation current flowing through the fourth winding surrounds the second magnetic pillar of the first magnetic pillar unit;
   wherein the second winding is wound on the first magnetic pillar of the second magnetic pillar unit, the fifth winding is wound on the second magnetic pillar of the second magnetic pillar unit, and a second excitation current flowing through the second winding surrounds the first magnetic pillar of the second magnetic pillar unit in a direction opposite to a direction in which a fifth excitation current flowing through the fifth winding surrounds the second magnetic pillar of the second magnetic pillar unit; and
   the third winding is wound on the first magnetic pillar of the third magnetic pillar unit, the sixth winding is wound on the second magnetic pillar of the third magnetic pillar unit, and a third excitation current flowing through the third winding surrounds the first magnetic pillar of the third magnetic pillar unit in a direction opposite to a direction in which a sixth excitation current flowing through the sixth winding surrounds the second magnetic pillar of the third magnetic pillar unit.

2. The three-phase transformer assembly according to claim 1, wherein the first magnetic pillar unit, the second magnetic pillar unit, and the third magnetic pillar unit are sequentially arranged at intervals along a first direction, the first magnetic pillar and the second magnetic pillar in each of the magnetic pillar units are arranged at intervals along a second direction, and an angle between the first direction and the second direction is ranging from 60° to 120°; and
   two ends of each of the first magnetic pillars are respectively connected to the first cover plate and the second cover plate, and two ends of each of the second magnetic pillar are respectively connected to the first cover plate and the second cover plate.

3. The three-phase transformer assembly according to claim 1, wherein the first cover plate and the second cover plate are both of integrated plate structures and are arranged in parallel, and the first magnetic pillars and the second magnetic pillars are perpendicular to the first cover plate and the second cover plate.

4. The three-phase transformer assembly according to claim 1, wherein each of the windings comprises a primary winding and a secondary winding.

5. The three-phase transformer assembly according to claim 1, wherein the first excitation current and the fourth excitation current have a same amplitude and phase, the second excitation current and the fifth excitation current have a same amplitude and phase, and the third excitation current and the sixth excitation current have a same amplitude and phase, and
the phases of the first excitation current, the second excitation current, and the third excitation current are different by 120°.

6. The three-phase transformer assembly according to claim 5, wherein the direction in which the first excitation current surrounds the first magnetic pillar of the first magnetic pillar unit, the direction in which the second excitation current surrounds the first magnetic pillar of the second magnetic pillar unit and the direction in which the third excitation current surrounds the first magnetic pillar of the third magnetic pillar unit are the same.

7. A power module comprising a three-phase transformer assembly, three-phase transformer assembly comprising two three-phase transformers, the three-phase transformer assembly comprising:
a magnetic core comprising a first cover plate, a second cover plate and magnetic pillar units, wherein the first cover plate and the second cover plate are arranged opposite to each other, the magnetic pillar units are sandwiched between the first cover plate and the second cover plate, the magnetic pillar units comprise a first magnetic pillar unit, a second magnetic pillar unit, and a third magnetic pillar unit, each of the magnetic pillar units comprises a first magnetic pillar and a second magnetic pillar; and
windings comprising a first winding, a second winding, a third winding, a fourth winding, a fifth winding, and a sixth winding,
wherein the first winding is wound on the first magnetic pillar of the first magnetic pillar unit, the fourth winding is wound on the second magnetic pillar of the first magnetic pillar unit, and a first excitation current flowing through the first winding surrounds the first magnetic pillar of the first magnetic pillar unit in a direction opposite to a direction in which a fourth excitation current flowing through the fourth winding surrounds the second magnetic pillar of the first magnetic pillar unit;
wherein the second winding is wound on the first magnetic pillar of the second magnetic pillar unit, the fifth winding is wound on the second magnetic pillar of the second magnetic pillar unit, and a second excitation current flowing through the second winding surrounds the first magnetic pillar of the second magnetic pillar unit in a direction opposite to a direction in which a fifth excitation current flowing through the fifth winding surrounds the second magnetic pillar of the second magnetic pillar unit; and
the third winding is wound on the first magnetic pillar of the third magnetic pillar unit, the sixth winding is wound on the second magnetic pillar of the third magnetic pillar unit, and a third excitation current flowing through the third winding surrounds the first magnetic pillar of the third magnetic pillar unit in a direction opposite to a direction in which a sixth excitation current flowing through the sixth winding surrounds the second magnetic pillar of the third magnetic pillar unit.

8. The power module according to claim 7, wherein the power module comprises two three-phase LLC circuit modules,
the first excitation current and the fourth excitation current have a same amplitude and phase, the second excitation current and the fifth excitation current have a same amplitude and phase, and the third excitation current and the sixth excitation current have a same amplitude and phase;
the phases of the first excitation current, the second excitation current, and the third excitation current are different by 120°.

9. The power module according to claim 8, wherein the direction in which the first excitation current surrounds the first magnetic pillar of the first magnetic pillar unit, the direction in which the second excitation current surrounds the first magnetic pillar of the second magnetic pillar unit and the direction in which the third excitation current surrounds the first magnetic pillar of the third magnetic pillar unit are the same.

10. The power module according to claim 8, wherein the first winding, the second winding and the third winding are respectively used to form a first transformer, a second transformer and a third transformer of a first three-phase LLC circuit module of the two three-phase LLC circuit modules, and the fourth winding, the fifth winding and the sixth winding are respectively used to form a first transformer, a second transformer and a third transformer of a second three-phase LLC circuit module of the two three-phase LLC circuit modules.

11. The power module according to claim 10, wherein each of the two three-phase LLC circuit modules comprises input terminals for electrically connecting a same DC power source; a first switch bridge arm, a second switch bridge arm and a third switch bridge arm connected in parallel between a positive electrode and a negative electrode of the input terminals; the first transformer, the second transformer and the third transformer; output terminals for electrically connecting loads; and a fourth switch bridge arm, a fifth switch bridge arm and a sixth switch bridge arm connected in parallel between a positive electrode and a negative electrode of the output terminals;
in each of the three-phase LLC circuit modules, a midpoint of the first switching bridge arm is electrically connected to a primary winding of the first transformer through a first resonant inductor, and a secondary winding of the first transformer is electrically connected to a midpoint of the fourth switching bridge arm; a midpoint of the second switching bridge arm is electrically connected to a primary winding of the second transformer through a second resonant inductor, and a secondary winding of the second transformer is electrically connected to a midpoint of the fifth switching bridge arm; and a midpoint of the third switching bridge arm is electrically connected to a primary winding of the third transformer through a third resonant inductor, and a secondary winding of the third transformer is electrically connected to a midpoint of the sixth switch bridge arm.

12. The power module according to claim 7, wherein the first magnetic pillar unit, the second magnetic pillar unit, and the third magnetic pillar unit are sequentially arranged at intervals along a first direction, the first magnetic pillar and the second magnetic pillar in each of the magnetic pillar units are arranged at intervals along a second direction, and an angle between the first direction and the second direction is ranging from 60° to 120°; and two ends of each of the first magnetic pillars are respectively connected to the first cover plate and the second cover plate, and two ends of each of the second magnetic pillar are respectively connected to the first cover plate and the second cover plate.

13. The power module according to claim 7, wherein the first cover plate and the second cover plate are both of integrated plate structures and are arranged in parallel, and the first magnetic pillars and the second magnetic pillars are perpendicular to the first cover plate and the second cover plate.

14. The power module according to claim 7, wherein each of the windings comprises a primary winding and a secondary winding.

* * * * *